United States Patent [19]

Peterson et al.

[11] Patent Number: 5,271,756
[45] Date of Patent: Dec. 21, 1993

[54] MACHINE FOR FORMING GLASS CONTAINERS

[75] Inventors: George T. Peterson, Bristol; Timothy J. Liska, West Simsbury; John W. McDevitt, Vernon, all of Conn.

[73] Assignee: Emhart Glass Machinery Investments Inc., Wilmington, Del.

[21] Appl. No.: 992,590

[22] Filed: Dec. 18, 1992

[51] Int. Cl.⁵ .............................................. C03B 7/14
[52] U.S. Cl. ........................................ 65/163; 65/164; 65/221; 65/225; 65/303; 65/304; 65/DIG. 13
[58] Field of Search .............. 65/160, 163, 164, 207, 65/221, 222, 223, 224, 225, 303, 304, DIG. 13

[56] References Cited

U.S. PATENT DOCUMENTS

| | | | |
|---|---|---|---|
| 4,402,721 | 9/1983 | Ericson et al. | 65/164 |
| 4,453,963 | 6/1984 | Larson et al. | 65/164 |
| 4,459,146 | 7/1984 | Farkas et al. | 65/164 |
| 4,547,211 | 10/1985 | Ananias | 65/164 |
| 4,641,269 | 2/1987 | Japenga et al. | 65/163 |
| 4,685,947 | 8/1987 | Liska et al. | 65/DIG. 13 |
| 4,723,980 | 2/1988 | Sidler et al. | 65/164 |

Primary Examiner—W. Gary Jones
Assistant Examiner—Steven P. Griffin
Attorney, Agent, or Firm—Spencer T. Smith

[57] ABSTRACT

An I.S. machine is made up of a plurality of independent individual sections for receiving gobs of molten glass and for forming the gobs into glass containers. A gob distributor delivers gobs to the sections. The controller of these sections and the gob distributor are synchronized by means for generating a once per cut signal, a divide by N circuit where N is the number of sections which are to have gobs distributed to them, means for defining N, means for applying N to the divide by N circuit, means for supplying the once per cut signal to the divide by N circuit, and means for distributing the output signal of the divide by N circuit to each of the section and gob distributor controllers.

3 Claims, 1 Drawing Sheet

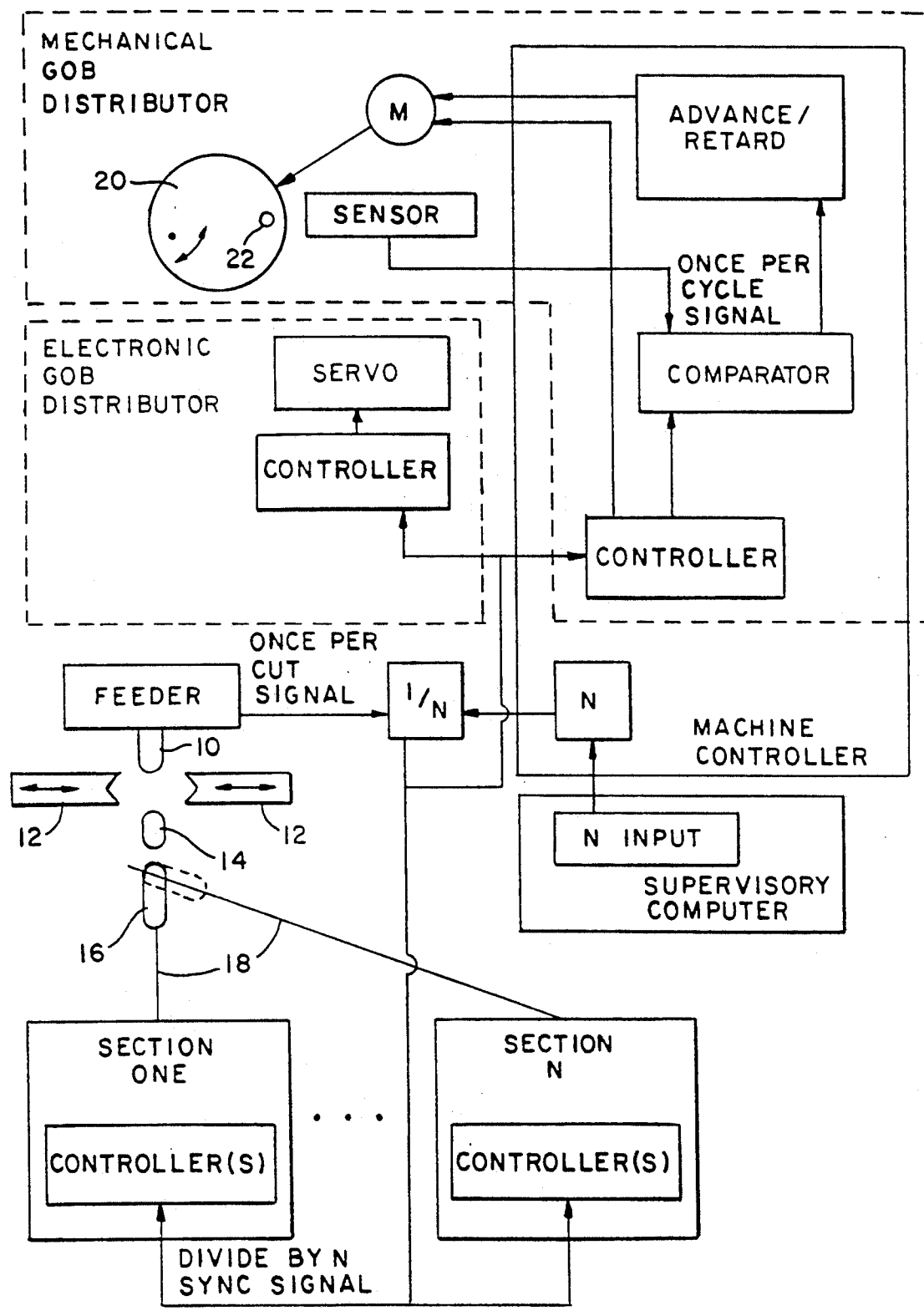

MACHINE FOR FORMING GLASS CONTAINERS

The present invention relates to machines for forming glass containers from gobs of molten glass. One such machine, which is referred to as an I.S. (individual section) machine, has a plurality of individual sections each of which has a blank mold for receiving a gob or gobs and for forming them into parisons and a blow mold to which the parisons are transferred to be formed into containers.

A feeder working in conjunction with a shear mechanism defines discrete gobs of molten glass which are delivered in a given sequence or firing order to the blank mold of the sections by a gob distributor. In state of the art systems made by the assignee of this application each section has a controller including a repetitive sequencer for controlling the actions required by that section and a machine controller, which also has a repetitive sequencer for controlling the actions of mechanisms not dedicated to a specific section (the gob distributor, for example). Such a gob distributor could be mechanically (cam) operated or it could be operated by a profiled motion actuator (a servo, for example).

In both cases a once per cycle gob distributor signal is generated when the gob distributor returns to its start position where it will be ready to deliver gobs to the first section in the firing order. In both cases once per cut feeder signals are distributed to each section and to the machine controller. Each section controller will define the sync signal as the feeder once per cut signal that is immediately before the once per cycle gob distributor signal and each repetitive sequencer will then know its start position. When the gob distributor is cam operated the machine controller knows the desired phase difference between these two signals (the phase set point)—(10°, for example) and can advance or retard the gob distributor motor to rotate the cam to establish the desired set point. This correction, accordingly, fine tuned the already established phase difference between the gob distributor signal and the immediate prior feeder signal.

In a mechanical gob distributor the gob distributor will always be located at the first firing position when the once per cycle gob distributor pulse is signalled. When, however, a servo gob distributor is used this is not the case and it is necessary to coordinate the gob distributor to the firing order which is defined by the sync signal. This has traditionally been done by allowing the servo gob distributor to see the firing order of the sections and then conform its sequence to the firing order of the sections. This has in practice been achieved by supplying the servo gob distributor with the section signals which control whether the gob distributor interceptor is to be in the advanced position to prevent gobs from being directed to a section or in the retracted position to allow gobs to the section. The only time a section interceptor signal will be on is when it is the turn of that section in the firing order and discrete wires from the sections to the servo gob distributor accordingly informed the servo gob distributor of the firing order.

In summary therefore, each controller (sections and machine) received once per cycle and once per cut signals and individually defined the sync signal for their controller. Additionally for servo gob distributors, the firing order of the sections had to be communicated from the sections to the servo gob distributor which had to be able to receive and conform to this information.

It is accordingly an object of the present invention to provide an improved system for synchronizing the section and machine controller and the gob distributor.

Other objects and advantages of the present invention will become apparent from the following portion of this specification and from the accompanying drawings which illustrate in accordance with the mandate of the patent statutes a presently preferred embodiment incorporating the principles of the invention.

Referring to the drawings:

The sole figure discloses an I.S. machine made in accordance with the teachings of the present invention.

An I.S. machine has a Feeder which controls the feeding of a continuous runner 10 of molten glass downwardly to an opposed pair of shears 12 which sever a discrete gob 14 from the runner. The gob falls into a gob distributor 16 which delivers the gobs to troughs 18 which deliver the gobs to the individual sections (Section one to Section N) of the machine in conformance with a selected firing order. For example, a common firing order for a six section machine could be section 1, section 4, section 3, section 6, section 5, section 2. Each section is controlled by one or more Controllers, each of which would have a repetitive sequencer to control the time when associated regulators and profiled motion actuators would operate. To properly run the machine these Controllers need to be synchronized. The Feeder raises a once per cut signal (this would also be done via the feeder cam or from the drive cabinet, for example). An operator inputs (this could be done automatically) the number (N) of sections receiving gobs into the N input of the Supervisory Computer and the Supervisory Computer downloads this data to the machine controller (thereby defining the N in the N input) the N of the N input is supplied to a divide by N circuit. The divide by N circuit operates on once per cut signals from the feeder and raises a sync signal every Nth once per cut signal to synchronize the machine and section controllers.

In a machine having a Mechanical Gob Distributor which would have a cam 20 with a once per cycle signal generator 22, a Sensor will issue a once per cycle signal to a Comparator which compares the phase of the Controller which is synced by the divide by N sync signal with the phase of the cam and Advances/Retards the motor M until the desired phase difference (the phase set point) has been defined. In this situation the phase difference may correspond to a phase difference as large as 180° and the Advance/Retard circuit will drive the motor to shift the gob distributor firing order until it matches or conforms to that of the sections. Normal operation of the motor M is controlled by the Controller of the Mechanical Gob Distributor.

When the gob distributor is electronic it will be operated by a profiled motion actuator (here a Servo) which is controlled by a Controller having a repetitive sequencer. The divide by N sync signal is directed to all the controllers each of which has a repetitive sequencer including the Electronic Gob Distributor Controller, the Machine Controller and all the Section Controllers so that they will all be in sync.

We claim:

1. An I.S. machine comprising
   a feeder including means for cutting gobs of molten glass from a runner of molten glass, a plurality of independent individual sections for receiving gobs of molten glass and for forming the gobs into glass containers, each of said sections including a controller having a repetitive sequence that performs in timed relation to synchronization signals, a gob distributor displaceable to deliver gobs to said sections, a gob distributor controller having a repetitive sequencer that performs in timed relation to synchronization signals, and means for synchronizing said section controllers and said gob distributor controller so that said section and gob distributor controllers will operate in timed relation to the same synchronization signals including means for generating a once per cut signal, a divide by N circuit where N is the number of said sections which are to have gobs distributed to them, means for defining N, means for applying said defined N to said divide by N circuit, means for supplying said once per cut signal to said divide by N circuit whereby an output synchronization signal will be output each defined Nth once per cut signal, and means for distributing the output synchronization signals of said divide by N circuit to each of said section and gob distributor controllers.

2. An I.S. machine according to claim 1, wherein said feeder comprises said means for generating a once per cut signal.

3. An I.S. machine according to claim 1, further comprising a supervisory computer including N input means, said N input means comprising said means for defining N.

* * * * *